US011759949B2

(12) United States Patent
Jung et al.

(10) Patent No.: US 11,759,949 B2
(45) Date of Patent: Sep. 19, 2023

(54) METHOD, SYSTEM, AND NON-TRANSITORY COMPUTER-READABLE RECORDING MEDIUM FOR CONTROLLING A ROBOT

(71) Applicant: Bear Robotics, Inc., Redwood City, CA (US)

(72) Inventors: Sanghun Jung, Seoul (KR); Henry A. Leinhos, Palo Alto, CA (US); Fangwei Li, Belmont, CA (US); Ina Liu, Alameda, CA (US)

(73) Assignee: Bear Robotics, Inc., Redwood City, CA (US)

(*) Notice: Subject to any disclaimer, the term of this patent is extended or adjusted under 35 U.S.C. 154(b) by 185 days.

(21) Appl. No.: 17/526,351

(22) Filed: Nov. 15, 2021

(65) Prior Publication Data

US 2023/0150129 A1    May 18, 2023

(51) Int. Cl.
| | |
|---|---|
| *B25J 9/16* | (2006.01) |
| *B25J 19/02* | (2006.01) |
| *G05D 1/02* | (2020.01) |
| *G06T 5/00* | (2006.01) |

(52) U.S. Cl.
CPC .......... *B25J 9/1653* (2013.01); *B25J 19/023* (2013.01); *G05D 1/0246* (2013.01); *G05D 1/0272* (2013.01); *G06T 5/006* (2013.01)

(58) Field of Classification Search
CPC ...... B25J 9/1653; B25J 19/023; B25J 9/1692; B25J 9/1697; B25J 13/08; G05D 1/0246; G05D 1/0272; G05D 2201/0211; G05D 1/0248; G06T 5/006; G01S 17/00; G06V 7/80; G06V 10/24; G06V 10/243; G06V 10/247; G06V 20/56
See application file for complete search history.

(56) References Cited

U.S. PATENT DOCUMENTS 11,199,614 B1 * 12/2021 Gan ..................... H04N 17/002

FOREIGN PATENT DOCUMENTS

| JP | H0779383 A | 3/1995 |
|---|---|---|
| JP | 2007156576 A | 6/2007 |
| JP | 2021514495 A | 6/2021 |
| KR | 100914211 B1 | 8/2009 |
| WO | WO-2021068723 A1 * | 4/2021 |

* cited by examiner

*Primary Examiner* — Robert T Nguyen
(74) *Attorney, Agent, or Firm* — Dinsmore & Shohl LLP; Yongsok Choi, Esq.

(57) ABSTRACT

A method for controlling a robot is provided. The method includes the steps of: determining a first comparison axis with reference to a first target area specified by a camera module of a robot, and determining a second comparison axis with reference to a second target area specified by a scanner module of the robot and associated with the first target area; and correcting a reference coordinate system associated with the camera module with reference to a relationship between the first comparison axis and the second comparison axis.

23 Claims, 9 Drawing Sheets

200

300

METHOD, SYSTEM, AND NON-TRANSITORY COMPUTER-READABLE RECORDING MEDIUM FOR CONTROLLING A ROBOT

FIELD OF THE INVENTION

The present invention relates to a method, system, and non-transitory computer-readable recording medium for controlling a robot.

BACKGROUND

Robots are utilized to replace or assist people in various fields because they can automatically perform difficult tasks or repetitive operations. Recently, various researches are being conducted on techniques for correcting errors that occur in the process of operating robots.

As an example of related conventional techniques, Korean Registered Patent Publication No. 10-0914211 discloses a method for correcting a distorted image, the method comprising the steps of: receiving a two-dimensional correction indicator image for a correction indicator having a plurality of square grids photographed by a camera; extracting a plurality of feature data including coordinate information and connection information of vertexes between the grids from the correction indicator image; calculating distortion correction coefficients constituting a distortion correction algorithm, using the coordinate information of the plurality of feature data; and generating a correction file using the calculated coefficients.

However, the techniques introduced so far as well as the above-described conventional technique are mainly interested in how to improve the quality of image information or sensing information acquired by a robot, and have no interest in how to remedy errors occurring in the process of assembling or installing a hardware module for acquiring the image information or sensing information (e.g., a camera module or a scanner module), errors occurring in the hardware module due to environmental factors (e.g., temperature), and the like.

In general, a robot includes various hardware modules based on three-dimensional coordinate systems, and interworking is made between the modules. For example, when a camera module among the hardware modules is installed in a position (or direction) other than a predetermined position (or direction), problems related to matching or interlocking between the coordinate systems of the camera module and other hardware modules (e.g., a scanner module) may occur, which may be a major cause of malfunction of the robot. Further, when the robot is operated outdoors and temperature of a camera module (e.g., a three-dimensional camera module) installed in the robot increases due to sunlight or the like, there is a problem that a recognition error related to a roll direction occurs (specifically, a problem that an angular difference between the roll direction and a ground surface is greater as the temperature increases). In addition, due to conditions related to a drive module installed in the robot (e.g., wheel wear, wheelbase length changes, floor condition, etc.), there are cases where the robot fails to travel by a desired distance or rotate by a desired angle.

In this connection, the inventor(s) present a novel and inventive technique capable of precisely correcting an error associated with a hardware module (specifically, a camera module or a drive module) of a robot.

SUMMARY OF THE INVENTION

One object of the present invention is to solve all the above-described problems in the prior art.

Another object of the invention is to correct a reference coordinate system associated with a camera module (e.g., a three-dimensional camera) with reference to a relationship between a comparison axis determined by the camera module and a comparison axis determined by a scanner module (e.g., a LIDAR sensor), thereby correcting an error according to a position or direction in which the camera module is installed.

Yet another object of the invention is to correct a reference coordinate system associated with a camera module with reference to a relationship between a floor surface where a robot is located and a reference surface specified by the camera module, thereby correcting an error (specifically, an error in a roll direction) caused by a temperature increase.

Still another object of the invention is to correct travel property information (e.g., a size of wheels, a length of a wheelbase, etc.) of a robot with respect to a predetermined point specified by a scanner module of the robot, thereby correcting a difference between an actual travel distance of the robot and a recorded travel distance of the robot (e.g., a distance measured by an odometer of the robot), or a difference between an actual rotation angle of the robot and a recorded rotation angle of the robot (e.g., a rotation angle measured by the odometer of the robot).

The representative configurations of the invention to achieve the above objects are described below.

According to one aspect of the invention, there is provided a method for controlling a robot, the method comprising the steps of: determining a first comparison axis with reference to a first target area specified by a camera module of a robot, and determining a second comparison axis with reference to a second target area specified by a scanner module of the robot and associated with the first target area; and correcting a reference coordinate system associated with the camera module with reference to a relationship between the first comparison axis and the second comparison axis.

According to another aspect of the invention, there is provided a system for controlling a robot, the system comprising: a comparison axis determination unit configured to determine a first comparison axis with reference to a first target area specified by a camera module of a robot, and determine a second comparison axis with reference to a second target area specified by a scanner module of the robot and associated with the first target area; and a correction unit configured to correct a reference coordinate system associated with the camera module with reference to a relationship between the first comparison axis and the second comparison axis.

In addition, there are further provided other methods and systems to implement the invention, as well as non-transitory computer-readable recording media having stored thereon computer programs for executing the methods.

According to the invention, it is possible to correct a reference coordinate system associated with a camera module (e.g., a three-dimensional camera) with reference to a relationship between a comparison axis determined by the camera module and a comparison axis determined by a scanner module (e.g., a LIDAR sensor), thereby correcting an error according to a position or direction in which the camera module is installed.

According to the invention, it is possible to correct a reference coordinate system associated with a camera module with reference to a relationship between a floor surface where a robot is located and a reference surface specified by the camera module, thereby correcting an error (specifically, an error in a roll direction) caused by a temperature increase.

According to the invention, it is possible to correct travel property information (e.g., a size of wheels, a length of a wheelbase, etc.) of a robot with respect to a predetermined point specified by a scanner module of the robot, thereby correcting a difference between an actual travel distance of the robot and a recorded travel distance of the robot (e.g., a distance measured by an odometer of the robot), or a difference between an actual rotation angle of the robot and a recorded rotation angle of the robot (e.g., a rotation angle measured by the odometer of the robot).

DETAILED DESCRIPTION OF THE INVENTION

Figure 1:
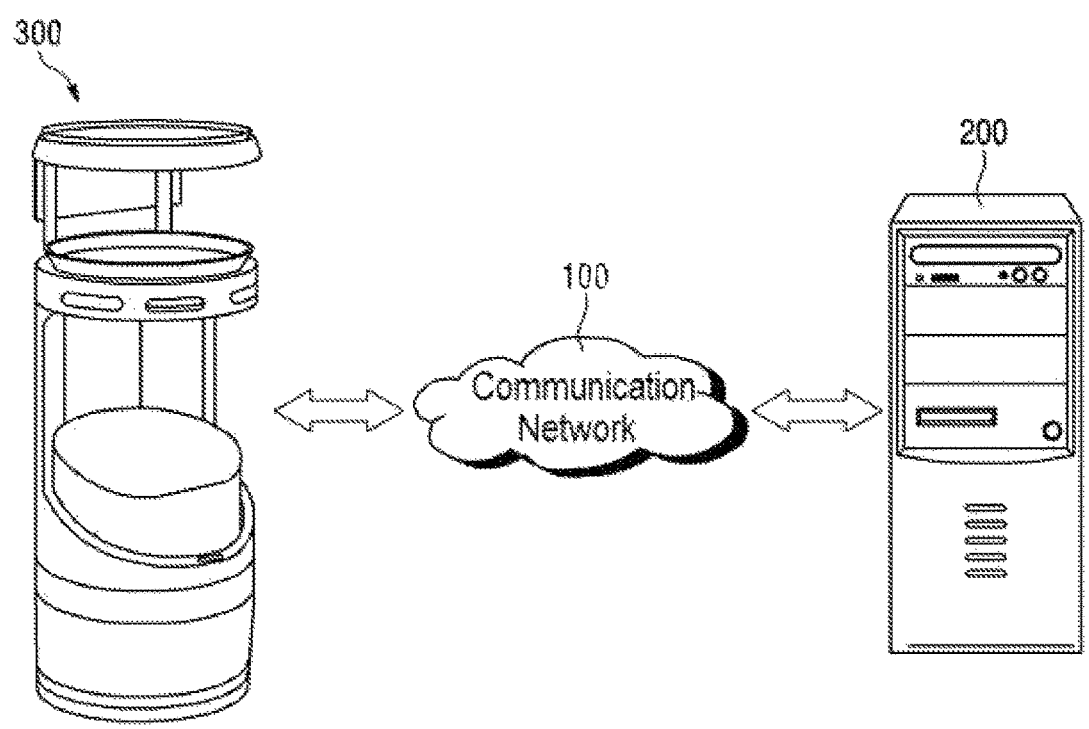
FIG. 1 schematically shows the configuration of an entire system for controlling a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a robot according to one embodiment of the invention.

As shown in FIG. 1, the entire system according to one embodiment of the invention may comprise a communication network 100, a correction system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the correction system 200 according to one embodiment of the invention may communicate with the robot 300 to be described below via the communication network 100, and may function to: determine a first comparison axis with reference to a first target area specified by a camera module (e.g., a three-dimensional camera) of the robot 300, and determine a second comparison axis with reference to a second target area specified by a scanner module (e.g., a LIDAR sensor) of the robot 300 and associated with the first target area; and correct a reference coordinate system associated with the camera module of the robot 300 with reference to a relationship between the first comparison axis and the second comparison axis.

Meanwhile, the above description is illustrative although the correction system 200 has been described as above, and it will be apparent to those skilled in the art that at least a part of the functions or components required for the correction system 200 may be implemented or included in the robot 300 to be described below or an external system (not shown), as necessary. Further, in some cases, all of the functions and components of the correction system 200 may be implemented or included in the robot 300.

Next, the robot 300 according to one embodiment of the invention is a device that may communicate with the correction system 200 via the communication network 100, and may autonomously perform predetermined functions or assigned tasks (e.g., serving food, retrieving containers, etc.) without any operation of a user. The robot 300 may include at least one of a module (e.g., a grab or a robotic arm module) for loading and unloading an object (e.g., a food tray), a camera module or a scanner module for information on surroundings, a display and speaker module for providing various images or sounds, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for supporting the functions according to the invention (e.g., correcting a reference coordinate system associated with the camera module). The application may be downloaded from the correction system 200 or an external application distribution server (not shown).

Configuration of the Correction System

Hereinafter, the internal configuration of the correction system 200 crucial for implementing the invention and the functions of the respective components thereof will be discussed.

Figure 2:
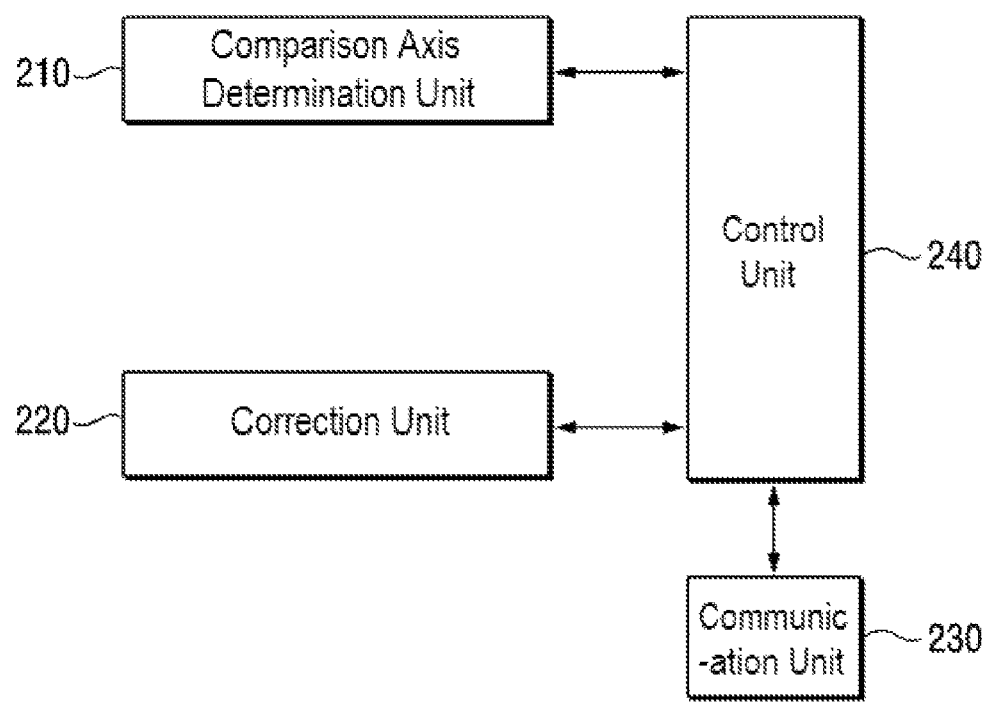
FIG. 2 illustratively shows the internal configuration of a correction system according to one embodiment of the invention.

FIG. 2 illustratively shows the internal configuration of the correction system 200 according to one embodiment of the invention.

As shown in FIG. 2, the correction system 200 according to one embodiment of the invention may comprise a comparison axis determination unit 210, a correction unit 220, a communication unit 230, and a control unit 240. According to one embodiment of the invention, at least some of the comparison axis determination unit 210, the correction unit 220, the communication unit 230, and the control unit 240 may be program modules that communicate with an external system. The program modules may be included in the correction system 200 in the form of operating systems, application program modules, and other program modules, while they may be physically stored in a variety of commonly known storage devices. Further, the program modules may also be stored in a remote storage device that may communicate with the correction system 200. Meanwhile, such program modules may include, but are not limited to, routines, subroutines, programs, objects, components, and data structures for performing specific tasks or executing specific abstract data types according to the invention as will be described below.

First, the comparison axis determination unit 210 according to one embodiment of the invention may function to determine a first comparison axis with reference to a first target area specified by a camera module of the robot 300. For example, the first target area according to one embodiment of the invention may be an area including a point or an object where two or more edges meet in a place (or space) where the robot 300 is located. More specifically, the first target area may include a wall corner area (more specifically, a vertex area of the wall corner) in the place where the robot 300 is located.

Figure 3A:
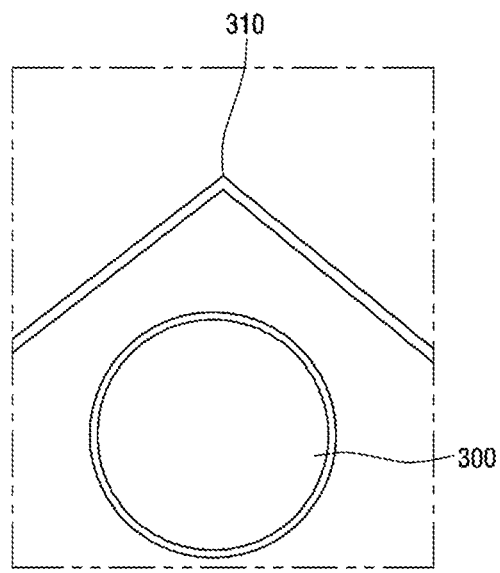
FIG. 3A illustratively shows how to correct a reference coordinate system associated with a camera module of a robot according to one embodiment of the invention.
Figure 3B:
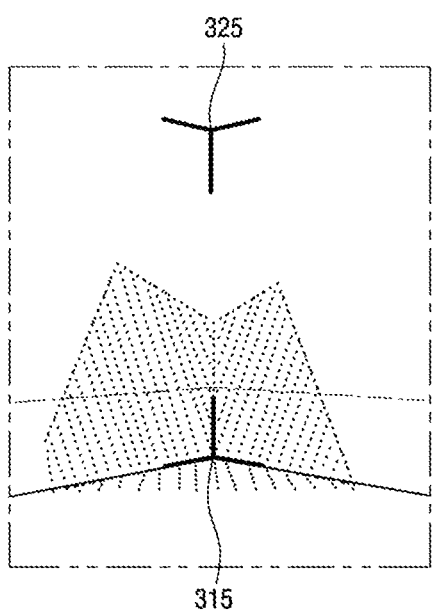
FIG. 3B illustratively shows how to correct a reference coordinate system associated with a camera module of a robot according to one embodiment of the invention.

For example, referring to FIGS. 3A and 3B, the first target area may be an area including a vertex 310 of a wall corner in a place such as a cuboid-shaped room where the robot 300 is located (e.g., the area may be specified in the form of a point cloud, a polygon, or the like by the camera module), and the comparison axis determination unit 210 may determine first comparison axes 315 with reference to three edges specified around the vertex 310 of the first target area. More specifically, the comparison axis determination unit 210 may specify a plurality of axes with respect to the three edges forming 90 degrees with each other around the vertex, respectively, and may determine the plurality of axes as the first comparison axes 315.

As another example, the first target area may be an area including a vertex of a cuboid-shaped bed in a place such as a bedroom where the robot 300 is located (e.g., the area may be specified in the form of a point cloud, a polygon, or the like by the camera module), and the comparison axis determination unit 210 may determine first comparison axes with reference to three edges specified around the vertex of the first target area. More specifically, the comparison axis determination unit 210 may specify a plurality of axes with respect to the three edges forming 90 degrees with each other around the vertex, respectively, and may determine the plurality of axes as the first comparison axes.

Further, the comparison axis determination unit 210 may function to determine a second comparison axis with reference to a second target area specified by a scanner module of the robot 300 and associated with the first target area. For example, the second target area according to one embodiment of the invention may be an area including a point or an object where two or more edges meet in a place (or space) where the robot 300 is located, and may be the same as the first target area or have a positional relationship or a predetermined relationship with the first target area. More specifically, the second target area may be an area including another vertex that shares one or more of the three edges specified with respect to the vertex included in the first target area, or that has a positional relationship (e.g., symmetrical displacement, parallel displacement, or rotational displacement) with the vertex included in the first target area. For example, when the place where the robot 300 is located is a cuboid-shaped room and the first target area is an area including a specific vertex of a wall corner in the room, the second target area may be an area including any one of the vertices other than the specific vertex.

For example, referring to FIGS. 3A and 3B again, when the above-described first target area is an area including a lower vertex 310 of a wall corner in a place (e.g., a cuboid-shaped room) where the robot 300 is located, the second target area associated with the first target area may be an area including an upper vertex of the wall corner (e.g., the area may be specified in the form of a point cloud, a polygon, or the like by the scanner module), and the comparison axis determination unit 210 may determine second comparison axes 325 with reference to three edges specified with respect to the upper vertex. More specifically, the comparison axis determination unit 210 may specify a plurality of axes with respect to the three edges forming 90 degrees with each other around the upper vertex, respectively, and may determine the plurality of axes as the second comparison axes 325.

Next, the correction unit 220 according to one embodiment of the invention may correct a reference coordinate system associated with the camera module with reference to a relationship between the first comparison axis and the second comparison axis determined by the comparison axis determination unit 210. The reference coordinate system associated with the camera module according to one embodiment of the invention may include a predetermined coordinate system (e.g., a rectangular coordinate system, a cylindrical coordinate system, or a spherical coordinate system) used by the camera module to recognize a real-world object, or a coordinate system specified on the basis of an optical axis of the camera module. Meanwhile, the reference coordinate system may be determined with reference to a position or direction in which the camera module is installed on or fixed to the robot 300.

For example, the correction unit 220 may determine a corrected reference coordinate system of the camera module by making a parallel displacement or rotational displacement of an uncorrected reference coordinate system of the camera module with reference to a distance or an angle between the first comparison axis and the second comparison axis that is specified by comparing the two axes.

Figure 4:
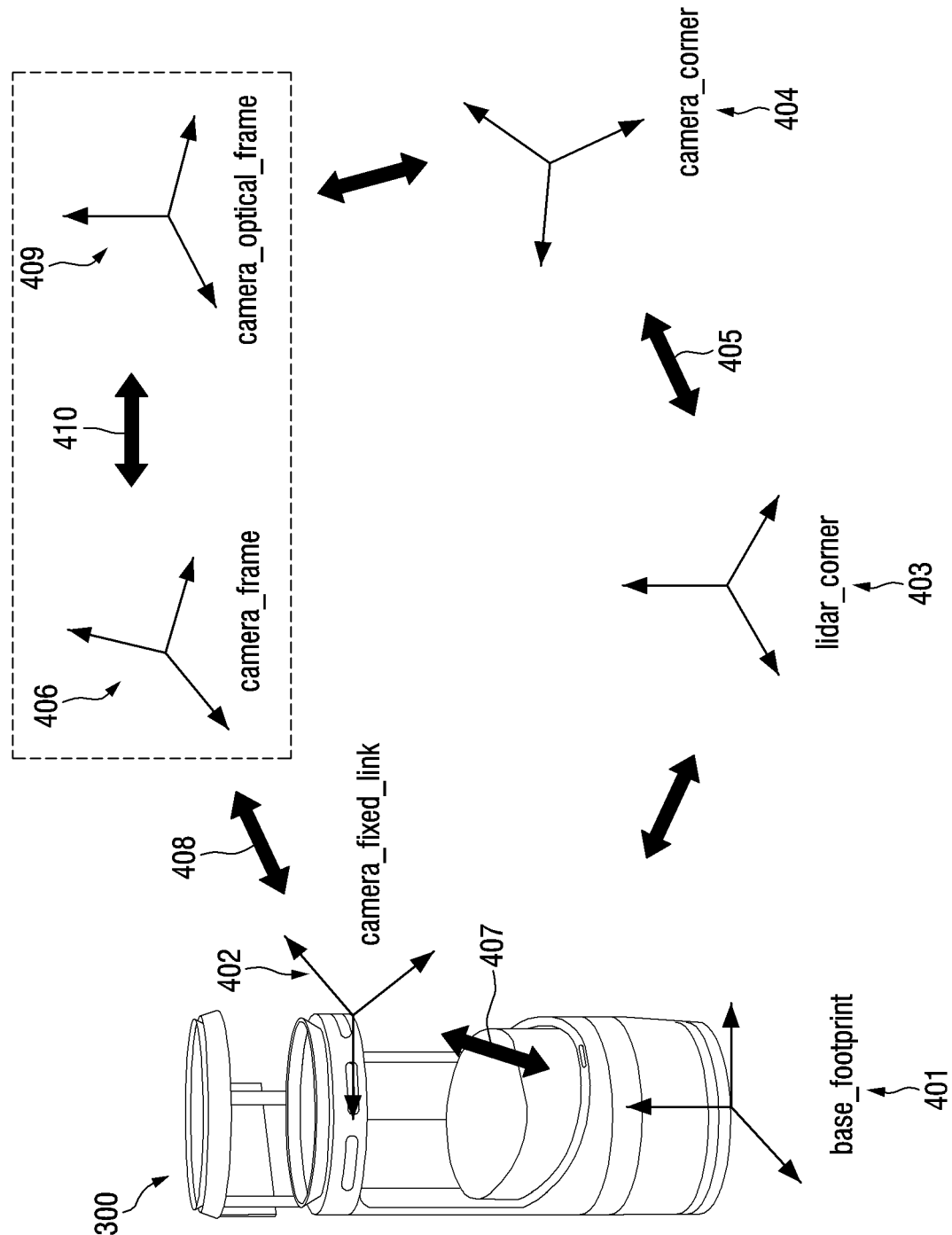
FIG. 4 illustratively shows how to correct a reference coordinate system associated with a camera module of a robot according to one embodiment of the invention.

More specifically, referring to FIG. 4, the correction unit 220 may determine a relationship 407 between a base reference coordinate system 401 specified with respect to a center of a floor surface where the robot 300 is located (e.g., a coordinate system specified with respect to base_footprint defined in a robot operating system (ROS) platform) (or a reference coordinate system associated with the scanner module) and an uncorrected reference coordinate system 402 of the camera module (e.g., a coordinate system specified with respect to camera_fixed_link defined in the ROS platform). For example, the relationship may be predetermined or may be determined with reference to a positional relationship (e.g., between the center of the floor surface where the robot 300 is located and a point where the camera module is installed). Next, the correction unit 220 may specify first comparison axes 403 on the basis of the base reference coordinate system 401 (or the reference coordinate system associated with the scanner module), and specify second comparison axes 404 on the basis of the uncorrected reference coordinate system 402 of the camera module. Next, the correction unit 220 may determine a corrected reference coordinate system 406 of the camera module by making a correction 408 to the uncorrected reference coordinate system 402 of the camera module with reference to the relationship 407 between the base reference coordinate system 401 and the uncorrected reference coordinate system 402 of the camera module, and a relationship 405 between the first comparison axes 403 and the second comparison axes 404. Meanwhile, in the above correction process, the correction may be made in consideration of external parameters, intrinsic parameters, and the like 409 and 410 of the camera module.

Figure 5A:
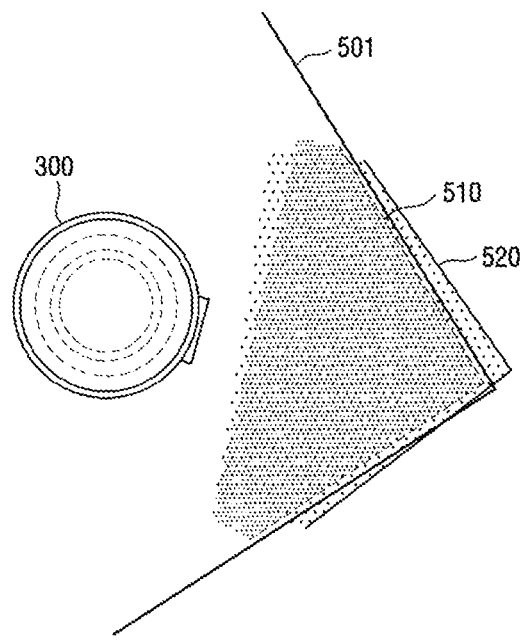
FIG. 5A illustratively shows how to correct a reference coordinate system associated with a camera module of a robot according to one embodiment of the invention.
Figure 5B:
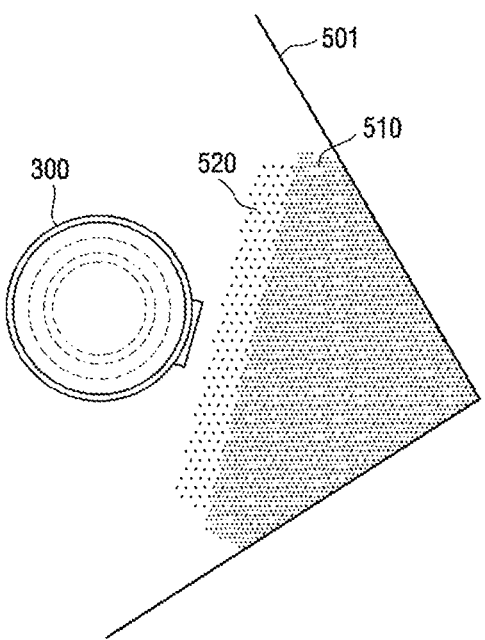
FIG. 5B illustratively shows how to correct a reference coordinate system associated with a camera module of a robot according to one embodiment of the invention.

Referring to FIG. 5A, when a wall corner 501 is specified through the camera module and the scanner module (e.g., a point cloud for the wall corner is acquired by each of the camera module and the scanner module), a difference may occur before the correction between a position 510 of the wall corner specified in a base reference coordinate system (or a reference coordinate system of the scanner module) and a position 520 of the wall corner specified in the reference coordinate system 402 of the camera module. However, referring to FIG. 5B, the position 510 of the wall corner specified in the base reference coordinate system (or the reference coordinate system of the scanner module) and the position 520 of the wall corner specified in the reference coordinate system 402 of the camera module may coincide with each other after the correction.

Further, the correction unit 220 may correct the reference coordinate system associated with the camera module with reference to a relationship between the floor surface where the robot 300 is located and a reference surface specified by the camera module.

Figure 6:
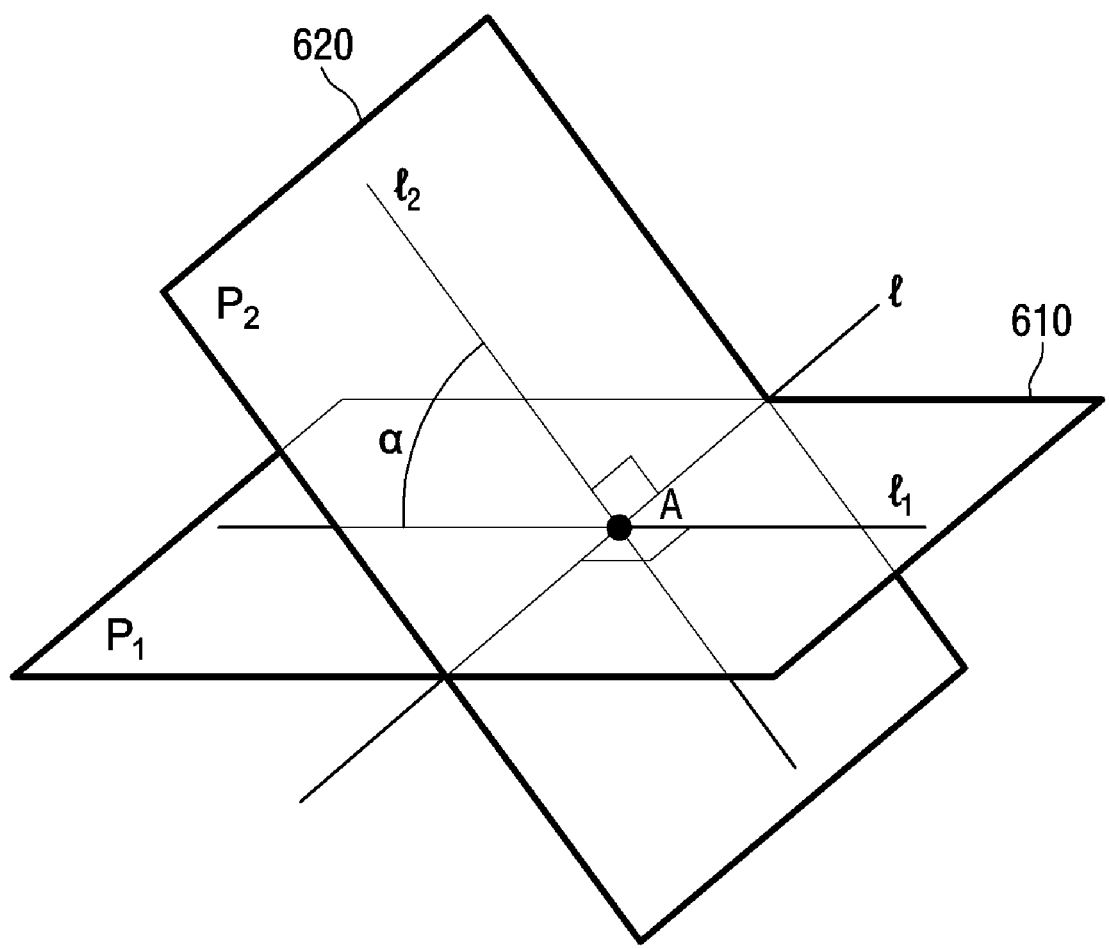
FIG. 6 illustratively shows how to correct a reference coordinate system associated with a camera module of a robot according to one embodiment of the invention.

For example, the correction unit 220 may correct the reference coordinate system associated with the camera module with reference to an angle between the floor surface where the robot 300 is located and the reference surface specified by the camera module. For example, referring to FIG. 6, the correction unit 220 may determine an angle between an axis of rotation of a floor surface 610 where the robot 300 is located and a reference surface 620 specified by the camera module (e.g., when a normal vector of the floor surface 610 is N1 and a normal vector of the reference surface 620 is N2, the axis of rotation may be calculated on the basis of a cross product operation on N1 and N2, and the angle may be calculated on the basis of an arccosine operation on a dot product of N1 and N2), and may correct the reference coordinate system associated with the camera module with reference to a result of applying Rodrigues' rotation formula on the basis of the angle and the axis of rotation.

As another example, the correction unit 220 may specify a candidate reference surface using at least three points on a ground surface specified by the camera module. Next, the correction unit 220 may determine the number of points located within a predetermined distance from the candidate reference surface among a plurality of points on the ground surface specified by the camera module. Next, the correction unit 220 may determine, from among a plurality of candidate reference surfaces including the above candidate reference surface, a candidate reference surface for which the number of points is not less than a predetermined level (e.g., a candidate reference surface having the largest number of points located within the predetermined distance) as the reference surface specified by the camera module.

As yet another example, the correction unit 220 may specify a candidate reference surface using at least three points on a ground surface specified by the camera module. Next, the correction unit 220 may determine points located within a predetermined distance from the candidate reference surface among a plurality of points on the ground surface specified by the camera module. Next, the correction unit 220 may determine the reference surface specified by the camera module, from among a plurality of candidate reference surfaces including the above candidate reference surface, with reference to the above points (e.g., with reference to a result of a regression analysis such as a logistic regression analysis of the above points).

Further, the correction unit 220 may correct travel property information of the robot 300 with reference to at least one of a travel distance and a rotation angle of the robot 300 determined with respect to a predetermined point specified by the scanner module. The travel property information of the robot 300 according to one embodiment of the invention may include information on a size (e.g., a radius or a circumferential length) of wheels, a length of a wheelbase, and the like of the robot 300.

Figure 7:
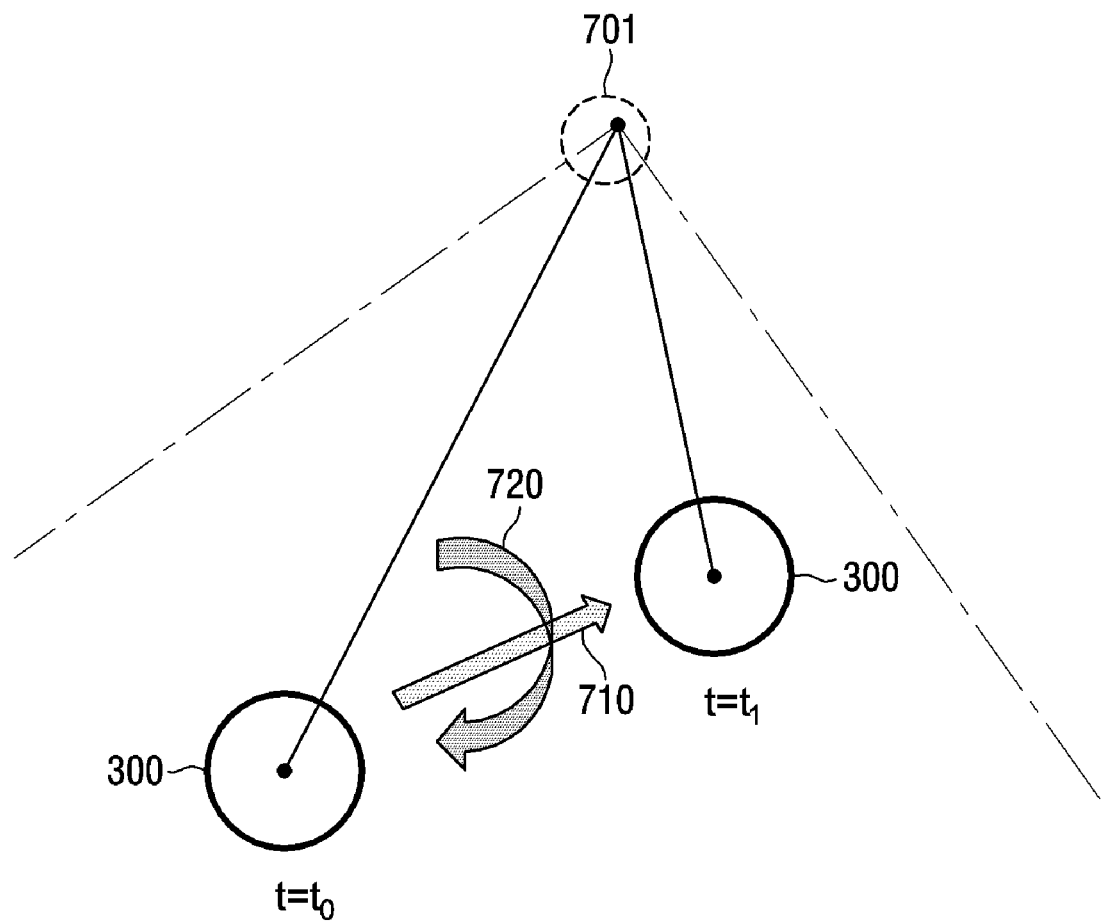
FIG. 7 illustratively shows how to correct travel property information of a robot according to one embodiment of the invention.

For example, referring to FIG. 7, the correction unit 220 may cause the robot 300 to move (or to repeatedly move) forward or backward 710 with respect to a predetermined point 701 (e.g., a wall corner) specified by the scanner module, and may calculate a difference between an actual travel distance of the robot 300 specified with respect to the predetermined point 701 (e.g., the actual travel distance may be calculated by calculating a position of the robot 300 with respect to the predetermined point 701) and a recorded travel distance of the robot 300 (e.g., a distance measured by an odometer of the robot 300) to correct information on the size of the wheels of the robot 300 on the basis of the difference. (Meanwhile, the above process may be repeatedly performed.) For example, assuming that an actual radius of the wheels and an estimated radius of the wheels are r' and r, respectively, and angular velocities of the left and right wheels are $W_L$ and $W_R$, respectively, a difference between an estimated translational velocity of the wheels v_estimated and an actual translational velocity of the wheels v_real, i.e., (v_real−v_estimated)/v_real may be calculated as 1−r/r', and the actual radius of the wheels may be specified as r'=r/(1− difference).

As another example, the correction unit 220 may cause the robot 300 to rotate (or to repeatedly rotate) clockwise or counterclockwise 720 with respect to a predetermined point specified by the scanner module, and may calculate a difference between an actual rotation angle of the robot 300 specified with respect to the predetermined point (e.g., the actual rotation angle may be calculated by calculating an angle of the robot 300 with respect to the predetermined point) and a recorded rotation angle of the robot 300 (e.g., a rotation angle measured by the odometer of the robot 300) to correct information on the length of the wheelbase of the robot 300 on the basis of the difference. For example, assuming that an actual length of the wheelbase and an estimated length of the wheelbase are l' and l, respectively, and angular velocities of the left and right wheels are $W_L$ and $W_R$, respectively, a difference between an estimated rotational velocity of the wheels w_estimated and an actual rotational velocity of the wheels w_real, i.e., (w_real−w_estimated)/w_real may be calculated as 1−l'/l, and the actual length of the wheelbase may be specified as l'=l×(1− difference).

Next, according to one embodiment of the invention, the communication unit 230 may function to enable data transmission/reception from/to the comparison axis determination unit 210 and the correction unit 220.

Lastly, according to one embodiment of the invention, the control unit 240 may function to control data flow among the comparison axis determination unit 210, the correction unit 220, and the communication unit 230. That is, the control unit 240 according to one embodiment of the invention may control data flow into/out of the correction system 200 or data flow among the respective components of the correction system 200, such that the comparison axis determination unit 210, the correction unit 220, and the communication unit 230 may carry out their particular functions, respectively.

EMBODIMENTS

A situation may be assumed in which the robot 300 according to one embodiment of the invention is located in a restaurant.

First, according to one embodiment of the invention, the robot 300 may travel to a wall corner in the restaurant. The restaurant may be a cuboid-shaped place.

Next, according to one embodiment of the invention, a first comparison axis may be determined with reference to a wall corner area specified by a camera module of the robot 300, and a second comparison axis may be determined with reference to a wall corner area specified by a scanner module of the robot 300. For example, the wall corner areas specified by the camera module and the scanner module may be the same wall corner area, or may be different wall corner areas having a positional relationship or a predetermined relationship.

Next, according to one embodiment of the invention, a reference coordinate system associated with the camera module may be corrected with reference to a relationship between the first comparison axis and the second comparison axis.

Further, an error may occur in the camera module when temperature increases in the process of operating the robot 300. In this case, the reference coordinate system associated with the camera module may be corrected with reference to an angle between a floor surface where the robot 300 is located and a reference surface specified by the camera module.

For example, a candidate reference surface may be specified using at least three points on a ground surface specified by the camera module, and the number of points located within a predetermined distance from the candidate reference surface among a plurality of points on the ground surface may be determined. From among a plurality of candidate reference surfaces including the above candidate reference surface, a candidate reference surface for which the number of points is not less than a predetermined level may be determined as the reference surface specified by the camera module.

Meanwhile, according to one embodiment of the invention, the above correction may be made when an error rate (specifically, an error rate related to an angular difference between the ground surface and a roll direction of the camera module of the robot 300) is not less than a predetermined level, with reference to the temperature of the camera module.

Further, according to one embodiment of the invention, wheels of the robot 300 may be worn in the process of operating the robot 300 or the floor of the restaurant may be in an uneven condition. In this case, travel property information of the robot 300 may be corrected with reference to at least one of a travel distance and a rotation angle of the robot 300 determined with respect to a predetermined point specified by the scanner module. Meanwhile, according to one embodiment of the invention, the process of correcting the travel property information of the robot 300 may be performed simultaneously with (or may be performed, depending on the wear condition or the floor condition, before or after) the process of correcting the reference coordinate system associated with the camera module.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 8:
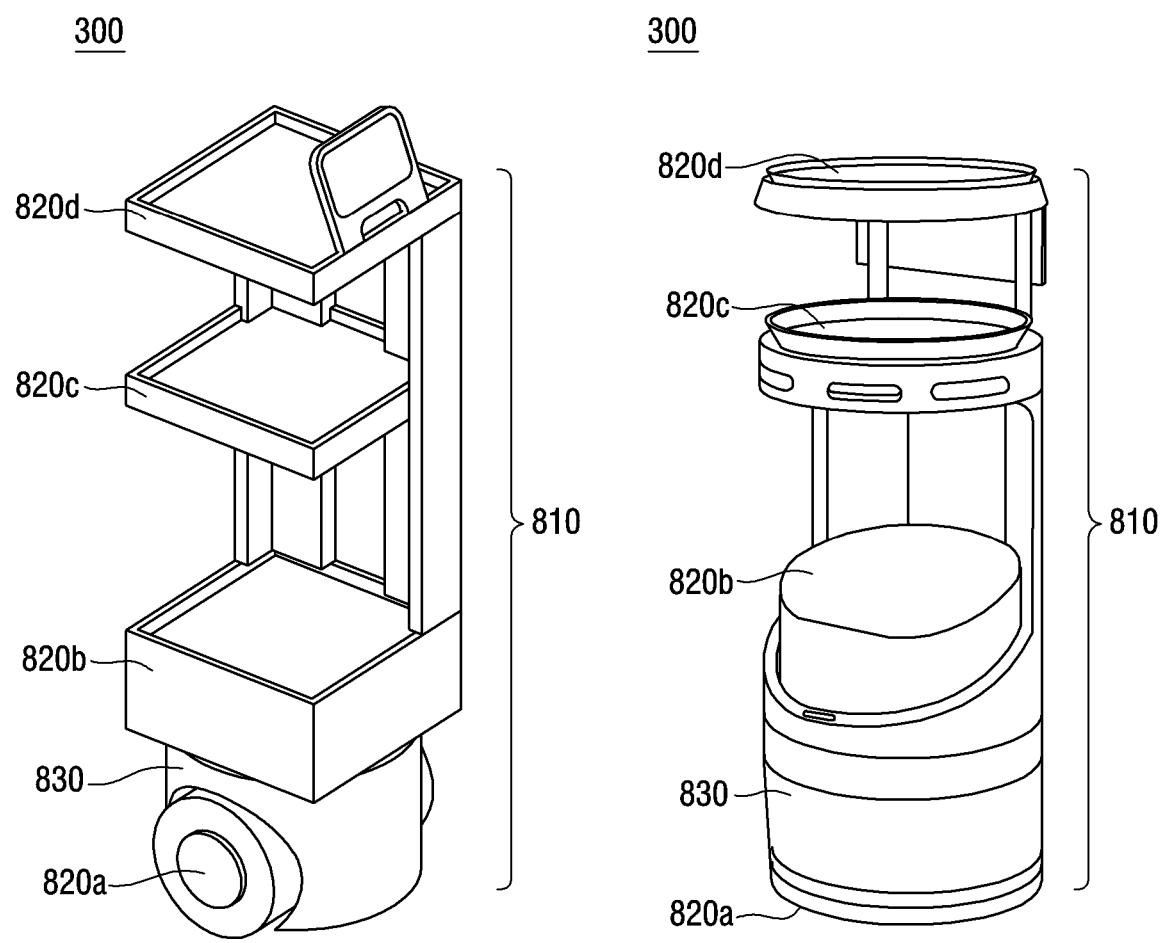
FIG. 8 illustratively shows the structure of a robot according to one embodiment of the invention.
Figure 9:
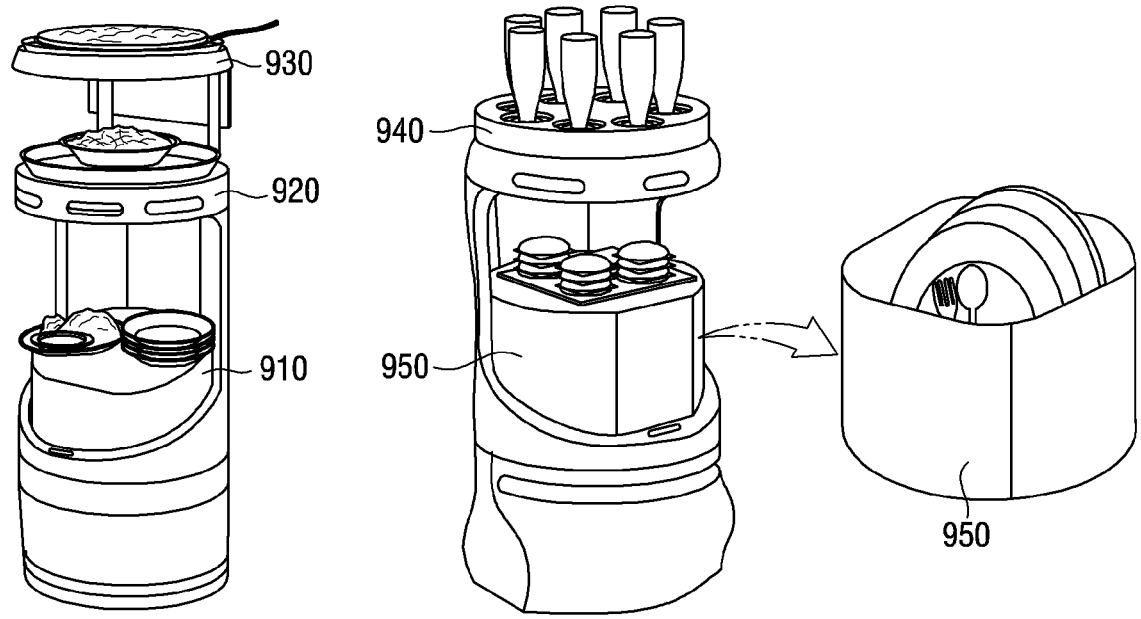
FIG. 9 illustratively shows the structure of a robot according to one embodiment of the invention.

FIGS. 8 and 9 illustratively show the structure of a robot according to one embodiment of the invention.

Referring to FIG. 8, the robot 300 may comprise a main body 810, a drive unit 820a, 820b, 820c, 820d, and a processor 830.

For example, the main body 810 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Referring to FIG. 9, when the robot 300 is a serving robot, it may include a first space 910 and a second space 920 for providing the transported object and collecting the retrieved object. Further, the robot 300 may further include a third space 930 that is an expansion space provided via a removable pillar, and more loading spaces may be provided by adding more expansion spaces as needed. Further, the robot 300 may further include a tray 940 dedicated for the transported or retrieved object. For example, the tray 940 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 910 of the robot 300 may include a fourth space 950 that may be taken out through a lateral side of the robot 300. The fourth space 950 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 8, the main body 810 may further include a camera module (e.g., a three-dimensional camera) (not shown) and a scanner module (e.g., a LIDAR sensor) (not shown) for acquiring images of surroundings (e.g., customers, tables, employees, other robots 300, etc.) and information on obstacles.

Next, the drive unit 820a, 820b, 820c, 820d according to one embodiment of the invention may comprise a module for moving the main body 810 to other locations or a module for loading and unloading the transported and retrieved objects.

For example, the drive unit 820a, 820b, 820c, 820d may include a module related to electrically, mechanically, or hydraulically driven wheels, propellers, or the like as the module for moving the main body 810 to other locations, and may include a robotic arm module for mounting and conveying the transported and retrieved objects as the module for loading and unloading the transported and retrieved objects.

Next, the processor 830 according to one embodiment of the invention may be electrically connected to the drive unit 820a, 820b, 820c, 820d to perform a function of controlling the drive unit 820a, 820b, 820c, 820d (and may include a communication module for communicating with an external system). For example, the processor 830 may refer to a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 830 may perform the functions of at least one of the comparison axis determination unit 210 and the correction unit 220 of the correction system 200 according to the invention (e.g., the corresponding functions may be modularized and included in the processor 830), and may function to control the drive unit 820a, 820b, 820c, 820d through communication with an external system (not shown) that performs the functions of at least one of the comparison axis determination unit 210 and the correction unit 220.

Specifically, the processor 830 may function to: determine a first comparison axis with reference to a first target area specified by a camera module of the robot 300, and determine a second comparison axis with reference to a second target area specified by a scanner module of the robot 300 and associated with the first target area; and correct a reference coordinate system associated with the camera module of the robot 300 with reference to a relationship between the first comparison axis and the second comparison axis.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a robot, the method comprising the steps of:
   determining a first comparison axis with reference to a first target area specified by a camera module of a robot, and determining a second comparison axis with reference to a second target area specified by a scanner module of the robot and associated with the first target area; and
   correcting a reference coordinate system associated with the camera module with reference to a relationship between the first comparison axis and the second comparison axis.

2. The method of claim 1, wherein the first target area or the second target area includes a point or an object where two or more edges meet in a place where the robot is located.

3. The method of claim 1, wherein in the determining step, the first comparison axis is determined with reference to an edge specified in the first target area, and the second comparison axis is determined with reference to an edge specified in the second target area.

4. The method of claim 1, wherein in the correcting step, the reference coordinate system associated with the camera module is corrected with reference to a relationship between a floor surface where the robot is located and a reference surface specified by the camera module.

5. The method of claim 4, wherein the reference coordinate system associated with the camera module is corrected with reference to an angle between the floor surface where the robot is located and the reference surface specified by the camera module.

6. The method of claim 4, wherein a candidate reference surface is specified using at least three points on a ground surface specified by the camera module, and a number of points located within a predetermined distance from the candidate reference surface among a plurality of points on the ground surface is determined, and wherein, from among a plurality of candidate reference surfaces including the candidate reference surface, a candidate reference surface for which the number of points is not less than a predetermined level is determined as the reference surface specified by the camera module.

7. The method of claim 4, wherein a candidate reference surface is specified using at least three points on a ground surface specified by the camera module, and points located within a predetermined distance from the candidate reference surface among a plurality of points on the ground surface are determined, and wherein the reference surface specified by the camera module is determined from among a plurality of candidate reference surfaces including the candidate reference surface, with reference to the points.

8. The method of claim 7, wherein the reference surface specified by the camera module is determined from among the plurality of candidate reference surfaces, with reference to a result of a regression analysis of the points.

9. The method of claim 1, wherein in the correcting step, the reference coordinate system associated with the camera module is corrected with reference to an angle between the first comparison axis and the second comparison axis.

10. The method of claim 1, wherein the correcting step comprises the step of correcting travel property information of the robot with reference to at least one of a travel distance and a rotation angle of the robot determined with respect to a predetermined point specified by the scanner module.

11. The method of claim 10, wherein the travel property information includes information on at least one of a size of wheels and a length of a wheelbase of the robot.

12. A non-transitory computer-readable recording medium having stored thereon a computer program for executing the method of claim 1.

13. A system for controlling a robot, the system comprising:
 a comparison axis determination unit configured to determine a first comparison axis with reference to a first target area specified by a camera module of a robot, and determine a second comparison axis with reference to a second target area specified by a scanner module of the robot and associated with the first target area; and
 a correction unit configured to correct a reference coordinate system associated with the camera module with reference to a relationship between the first comparison axis and the second comparison axis.

14. The system of claim 13, wherein the first target area or the second target area includes a point or an object where two or more edges meet in a place where the robot is located.

15. The system of claim 13, wherein the comparison axis determination unit is configured to determine the first comparison axis with reference to an edge specified in the first target area, and determine the second comparison axis with reference to an edge specified in the second target area.

16. The system of claim 13, wherein the correction unit is configured to correct the reference coordinate system associated with the camera module with reference to a relationship between a floor surface where the robot is located and a reference surface specified by the camera module.

17. The system of claim 16, wherein the correction unit is configured to correct the reference coordinate system associated with the camera module with reference to an angle between the floor surface where the robot is located and the reference surface specified by the camera module.

18. The system of claim 16, wherein the correction unit is configured to specify a candidate reference surface using at least three points on a ground surface specified by the camera module, and determine a number of points located within a predetermined distance from the candidate reference surface among a plurality of points on the ground surface, and wherein the correction unit is configured to determine, from among a plurality of candidate reference surfaces including the candidate reference surface, a candidate reference surface for which the number of points is not less than a predetermined level as the reference surface specified by the camera module.

19. The system of claim 16, wherein the correction unit is configured to specify a candidate reference surface using at least three points on a ground surface specified by the camera module, and determine points located within a predetermined distance from the candidate reference surface among a plurality of points on the ground surface, and wherein the correction unit is configured to determine the reference surface specified by the camera module, from among a plurality of candidate reference surfaces including the candidate reference surface, with reference to the points.

20. The system of claim 19, wherein the reference surface specified by the camera module is determined from among the plurality of candidate reference surfaces, with reference to a result of a regression analysis of the points.

21. The system of claim 13, wherein the correction unit is configured to correct the reference coordinate system associated with the camera module with reference to an angle between the first comparison axis and the second comparison axis.

22. The system of claim 13, wherein the correction unit is configured to correct travel property information of the robot with reference to at least one of a travel distance and a rotation angle of the robot determined with respect to a predetermined point specified by the scanner module.

23. The system of claim 22, wherein the travel property information includes information on at least one of a size of wheels and a length of a wheelbase of the robot.

* * * * *